Sept. 9, 1958       E. K. HANSEN       2,851,250

RETRACTABLE JACK SUPPORT FOR A VEHICLE TONGUE STRUCTURE

Filed Dec. 3, 1956       2 Sheets-Sheet 1

INVENTOR.

BY ELMER K. HANSEN

ATTORNEY

Sept. 9, 1958  E. K. HANSEN  2,851,250
RETRACTABLE JACK SUPPORT FOR A VEHICLE TONGUE STRUCTURE
Filed Dec. 3, 1956  2 Sheets-Sheet 2

INVENTOR.

BY ELMER K. HANSEN
Rudolph L. Lowell
ATTORNEY 2,851,250

RETRACTABLE JACK SUPPORT FOR A VEHICLE TONGUE STRUCTURE

Elmer K. Hansen, Sioux City, Iowa

Application December 3, 1956, Serial No. 625,830

3 Claims. (Cl. 254—86)

This invention relates generally to jack devices and in particular to a retractable jack device for supporting the tongue structure of a trailer vehicle, when the vehicle is disconnected from a tractor unit.

In the use of two-wheeled trailers for farm use, appreciable difficulty as well as manual effort is generally encountered in connecting and disconnecting the trailer tongue from a tractor draw bar. This is especially so when the trailer is loaded, since an appreciable part of the load is transmitted to the tongue structure, which functions with the wheels as a third point of support. Thus the load at this third point must be handled in the manipulation of the tongue structure for connecting and disconnecting purposes relative to the tractor draw bar.

It is an object of this invention, therefore, to provide an improved retractable jack device for the tongue structure of a trailer vehicle.

A further object of this invention is to provide a retractable jack device for a trailer vehicle tongue structure, which is permanently mounted on the tongue and adapted to be quickly and easily moved, and then locked, into operative and inoperative positions.

Still another object of this invention is to provide a retractable jack for a trailer tongue structure which is of a simple construction, always available and ready for use to locate the tongue in a hitch connecting position relative to a tractor draw bar and movable to an inoperative position that does not interfere in any way with a normal use of the tractor and trailer.

Further objects, features, and advantages of this invention will become apparent from the following description when taken in connection with the accompanying drawing in which.

Figure 1:
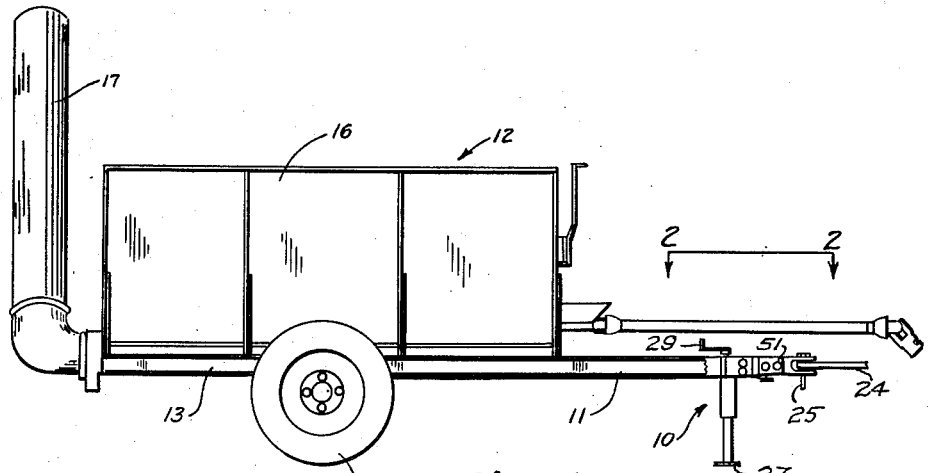
Fig. 1 is a side elevational view of a trailer vehicle and a tractor draw bar, showing the retractable jack device of this invention in assembly relation therewith.
Figure 2:
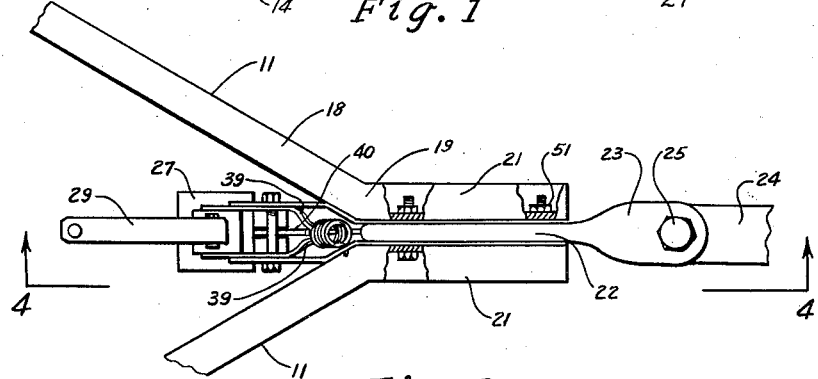
Fig. 2 is an enlarged plan view of the assembly in Fig. 1, as seen substantially along the line 2—2, with some parts broken away and other parts shown in section for the purpose of clarity.

With reference to the drawings, the retractable jack device, indicated generally at 10, is shown in Figs. 1 and 2 in assembly relation with the tongue structure 11 of a trailer vehicle 12. As illustrated, the tongue structure 11 is of a channel iron construction and formed as a part of the vehicle main frame 13, that is provided with a pair of wheels 14 and supports a wagon box 16 having a material unloading auger 17. The forward section 18 of the tongue structure 11 is of a V-shape having a front apex portion 19 that terminates in forwardly projected transversely spaced extensions 21 for receiving therebetween the shank 22 of a clevis or hitch member 23. A tractor draw bar or hitch member 24 is connected with the hitch member 23 by means of a usual hitch pin 25. The present invention contemplates the assembly of the trailer hitch member 23 as a part of the retractable jack device 10 and the tongue structure 11.

The jack device 10 (Fig. 3) includes a leg section 26 having a ground engaging foot portion 27, and a box or head section 28, that is operatively associated with the leg section 26 such that on manipulation of the hand crank 29 the leg section 26 is adjustably movable toward and away from the head section 28. Secured to and extended forwardly from the front side of the head section 28, at a position adjacent to the upper end of the head section, are a pair of transversely spaced bracket members 30. The projected portions 31 of the brackets 30 are of an irregular shape in that they converge in a downward direction so that the lower ends 32 of the portions 31 are closer together, transversely of the head section 28, than the upper ends 33 thereof, so as to be located within the transverse confines of the head section 28 for a purpose to appear later.

Pivotally supported at their rear ends 37 (Fig. 3) on the upper ends 33 of the projected portions 31, and arranged in a straddling relation therewith, are a pair of mounting members 34 that converge toward their forwardly extended ends 35 which are in a transversely spaced parallel relation so as to receive therebetween the shank 22 of the trailer hitch member 23. The pivot 36 extends through the rear end portions 37 of the mounting members 34, and through the upper ends 30 of the projected portions 31.

Arranged between the mounting members 34, at a position rearwardly of the hitch member 23 is a toggle assembly, indicated generally at 38 (Fig. 3) which includes a pair of link members 39 and a lever 40. The rear ends 41 of the link members 39 are pivotally connected at 43 to the mounting members 34 at positions below the pivot 36. The forward ends 44 of the link members 39 converge toward each other and are pivotally connected at 46 to the lever 40 at a position intermediate the lever front and rear ends 47 and 48, respectively. The lever 40 is slightly curved so as to have a downwardly faced concave side and has its rear end 48 received between and pivoted at 49 on the lower ends 32 of the brackets 30. When extended forwardly from its pivotal support 49, the lever 40 is of a length such that its front end 47 underlies and engages the rear end portion 50 of the shank 22 of the hitch member 23.

In the assembly of the retractable jack device 10 with the tongue structure 11 the hitch member shank 22 is arranged between the front extensions 35 of the mounting members 34. This assembly is then positioned between the front extensions 21 of the tongue structure 11 so that the jack device 10 is located rearwardly of the hitch member 23 and within the confines of the tongue structure apex portion 19, as best appears in Fig. 2.

Figure 3:
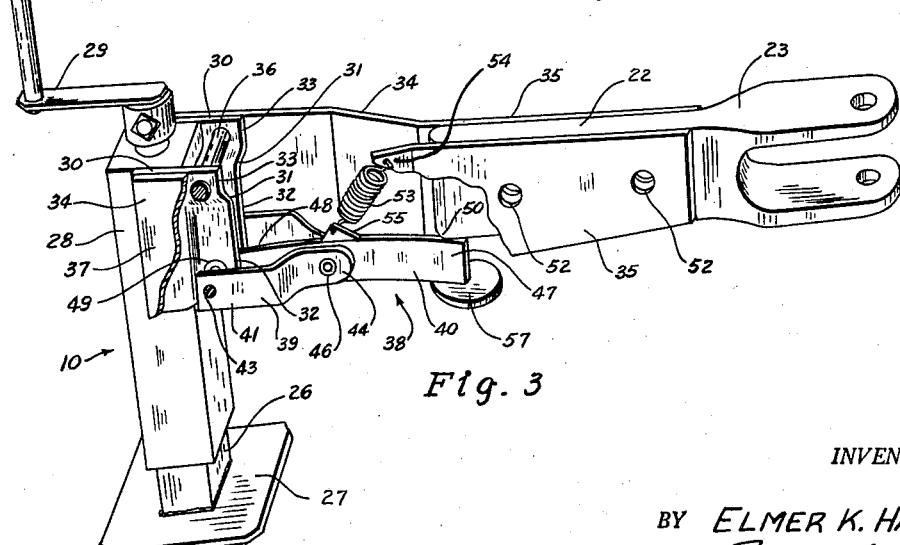
Fig. 3 is an enlarged perspective view of the retractable jack device shown in Fig. 1, with some parts broken away and other parts shown in section to more clearly show its construction.

The mounting members 34, tongue structure 11 and hitch member 23 are secured together by bolts 51 extended through aligned openings, indicated at 52 in Fig. 3, in the mounting member extensions 35, the tongue extensions 21 and the hitch member shank 22.

Figure 4:
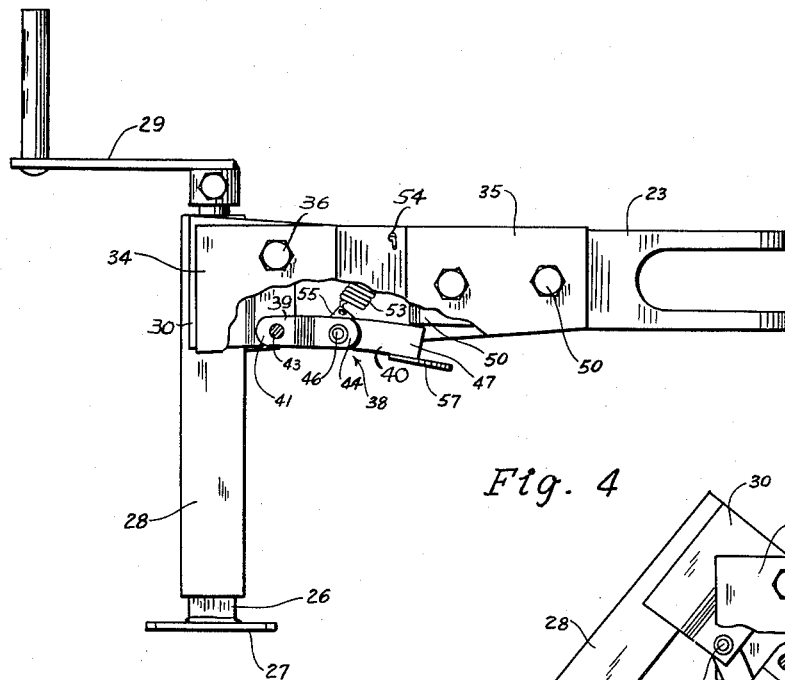
Fig. 4 is a side elevational view of the retractable jack device in an operative position, with certain parts broken away and other parts shown in section.

In use, assume the retractable jack device 10 to be in its operative position as shown in Figs. 3 and 4, wherein the head section 28 and leg section 26 are extended downwardly from the tongue structure 11 to provide for a ground engagement of the foot portion 27. When the jack device is in this operative position the links 39 and lever 40, of the toggle assembly 38, are in substantial alignment extended forwardly from their respective pivots 43 and 49, and with the front end 47 of the lever 40 in abutting engagement with the shank member 22 at the rear end portion 50 thereof. However, by virtue of the upward curvature of the lever 40, the pivot 46 is in an upward over-center position relative to the link pivots 43 and the front end 47 of the lever 40, and is locked against further upward movement by the lever 47. This over-center position of the pivot 46 is releasably maintained by a coil spring 53 connected at one end to a support member 34, as indicated at 54, and at its opposite end to an upward projection 55 formed on the lever 40. As a result, the jack device 10 is held in an upright position.

Figure 5:
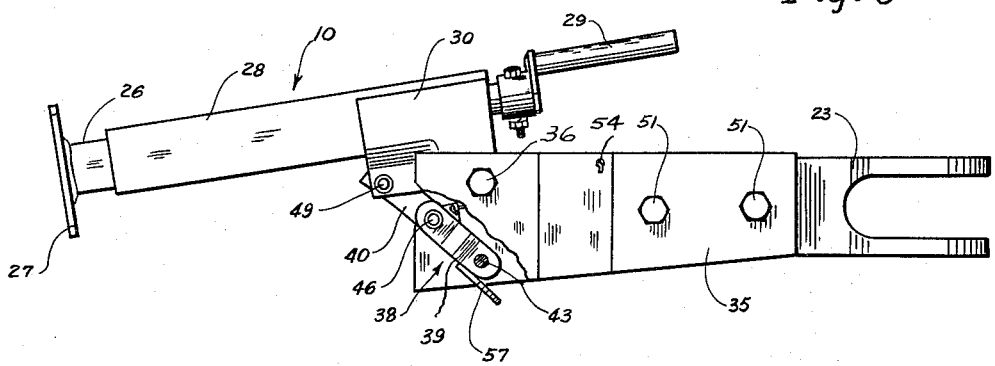
Fig. 5 is a side elevational view illustrated similarly to Fig. 4, and showing the retractable jack device in an inoperative position.

On manipulation of the crank 29 the hitch member 23 is vertically movable into an adjusted position relative to the tractor draw bar 24 to provide for their connection by the hitch pin 25. On completion of this connection the tongue structure 11 is held in a supported position on the draw bar 24 and the jack device 10 is retracted to its inoperative position shown in Fig. 5 in which the head section 28 and leg section 26 are located above the hitch member 23 and extended rearwardly therefrom.

Figure 6:
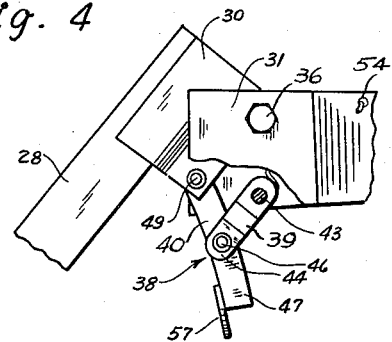
Fig. 6 is a foreshortened reduced side elevational view of the retractable jack device, illustrated similarly to Fig. 5, and showing the parts thereof in an intermediate position, relative to their positions shown in Figs. 4 and 5.

This inoperative position is accomplished by grasping a finger disc 57, secured to the underside of the lever 40 at its front end 47, and moving the end 47 away from the hitch member shank 22 so as to break the toggle lock of the assembly 38 against the action of the spring 53 as shown in the intermediate position illustrated in Fig. 6. The head section 28 may then be gripped and pulled upwardly from its intermediate position shown in Fig. 6, to its inoperative position shown in Fig. 5.

In this inoperative position the links 39 and the lever 40 are in substantial alignment between the pivot 49 for the lever 40 and the pivots 43 for the links 39, with the pivot 46 being moved to a second over-center position slightly above a direct line between the pivots 49 and 43 by virtue of the curvature of the lever 40. This second over-center position is maintained by the lever 40 by virtue of its reception between the link members 39 and the engagement of the finger disc 57 with the link ends 44. The spring 53 again functions to releasably maintain the toggle assembly 38 against movement out of such locked position.

With the retractable jack device 10 thus moved upwardly above the hitch member 23, the trailer 12 is used in a normal manner. When the trailer is to be disconnected from the tractor draw bar 24, the finger disc 57 is moved from its position in Fig. 5 to approximately its position shown in Fig. 6, at which time the head section 28 can be moved directly to its operative position shown in Fig. 4. Due to variations in ground level, it may again become necessary to manipulate the crank 29 to support the foot portion 27 on the ground such that the hitch pin 25 can be readily removed. The tongue structure 11 is then retained in this supported position until it is desired to again connect the vehicle 12 for towing purposes.

Although the invention has been described with respect to a preferred embodiment thereof, it is to be understood that it is not to be so limited since changes can be made therein which are within the full intended scope of this invention as defined by the appended claims.

I claim:

1. A retractable support for the tongue structure of a trailer vehicle comprising a jack device having a head section and a ground engaging section, a mounting member laterally extended forwardly from the head end of said jack device and secured to said tongue structure, means pivotally supporting said jack device on said mounting member for pivotal movement to operative and inoperative positions, a pair of link members pivotally supported at their rear ends at oppositely arranged positions on said mounting member, and extended forwardly therefrom when the jack device is in said operative position, a lever member pivotally connected at its rear end to said head section, and pivotally connected intermediate the ends thereof to the front ends of said link members, with said lever being movable into an over-center position relative to said link members for engagement of its front end with said tongue structure to hold said jack device in an operative position therefor, and movable into a second over-center position relative to said link members for engagement of its front end with the rear ends of said link members to hold said jack device in an inoperative position therefor, and spring means connected to said lever and to said mounting member for releasably holding said lever and link members in said over-center positions.

2. A retractable support for the tongue structure of a trailer vehicle comprising a jack device having a head section and a ground engaging section, pivoted mounting means for supporting said head section on said tongue structure for pivotal movement of said jack device to operative and inoperative positions, a toggle link assembly including a link pivotally connected at one end to said mounting means, and a lever pivotally connected at one end to said head section, and pivotally connected intermediate the ends thereof with the opposite end of said link, with said toggle assembly being movable to an over-center position in which the free end of said lever is in engagement with said tongue structure, whereby to hold said jack device in an operative position therefor, and movable to a second over-center position with the free end of said lever in engagement with the one end of said link to hold said jack device in an inoperative position therefor.

3. A retractable support for a trailer vehicle having a tongue structure with a V-shape forward section, a jack device having a head section and a ground engaging section, a lateral support fixed on said head section, mounting means pivotally connected with said support and attached to the forward section of said tongue structure to provide for a pivotal movement of said jack device to operative and inoperative positions within the transverse confines of said forward section, a toggle assembly including a link member pivotally connected at one end to said mounting means, a lever pivotally connected at one end to said head section, and pivotally connected intermediate the ends thereof to the other end of said link member, said toggle assembly being movable to an over-center position in which the free end of said lever is in engagement with the apex portion of said forward section to hold said jack device in an operative position therefor, and movable to a second over-center position in which the free end of said lever is in engagement with the one end of said link member to hold the jack device in an inoperative position therefor.

References Cited in the file of this patent

UNITED STATES PATENTS

| 1,610,598 | Boscariol | Dec. 14, 1926 |
| 2,196,510 | Vutz | Apr. 9, 1940 |

FOREIGN PATENTS

| 5,920 | Great Britain | Mar. 14, 1903 |